(12) United States Patent
Yamaguchi et al.

(10) Patent No.: US 8,345,268 B2
(45) Date of Patent: Jan. 1, 2013

(54) BEAM IRRADIATION DEVICE

(75) Inventors: Atsushi Yamaguchi, Ibi-Gun (JP); Yoshiaki Maeno, Mizuho (JP); Hiroyuki Mutou, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 315 days.

(21) Appl. No.: 12/907,828

(22) Filed: Oct. 19, 2010

(65) Prior Publication Data
US 2011/0090516 A1  Apr. 21, 2011

(30) Foreign Application Priority Data
Oct. 19, 2009  (JP) .................................. 2009-240804

(51) Int. Cl.
*G01B 11/14* (2006.01)
(52) U.S. Cl. .......................................... 356/615; 356/3
(58) Field of Classification Search ............. 356/3, 3.11, 356/615
See application file for complete search history.

(56) References Cited

U.S. PATENT DOCUMENTS
8,164,078 B2 * 4/2012 Maeno et al. ............ 250/559.38

FOREIGN PATENT DOCUMENTS
JP  2009-14698 A  1/2009

* cited by examiner

*Primary Examiner* — Roy M Punnoose
(74) *Attorney, Agent, or Firm* — Ditthavong Mori & Steiner, P.C.

(57) ABSTRACT

A beam irradiation device includes a photodetector which receives servo light and outputs a detection signal depending on a light receiving position of the servo light, and a signal processing section which obtains the light receiving position based on the detection signal. In the above arrangement, the signal processing section has an A/D conversion circuit which converts the detection signal into a digital signal, and an error signal adjusting circuit which converts an error component signal to be outputted from the photodetector when the photodetector is not irradiated by the servo light, into a signal within a processable range of the A/D conversion circuit, and supplies the converted signal to the A/D conversion circuit. A first digital signal derived from the detection signal is corrected with a second digital signal derived from the error component signal.

5 Claims, 14 Drawing Sheets

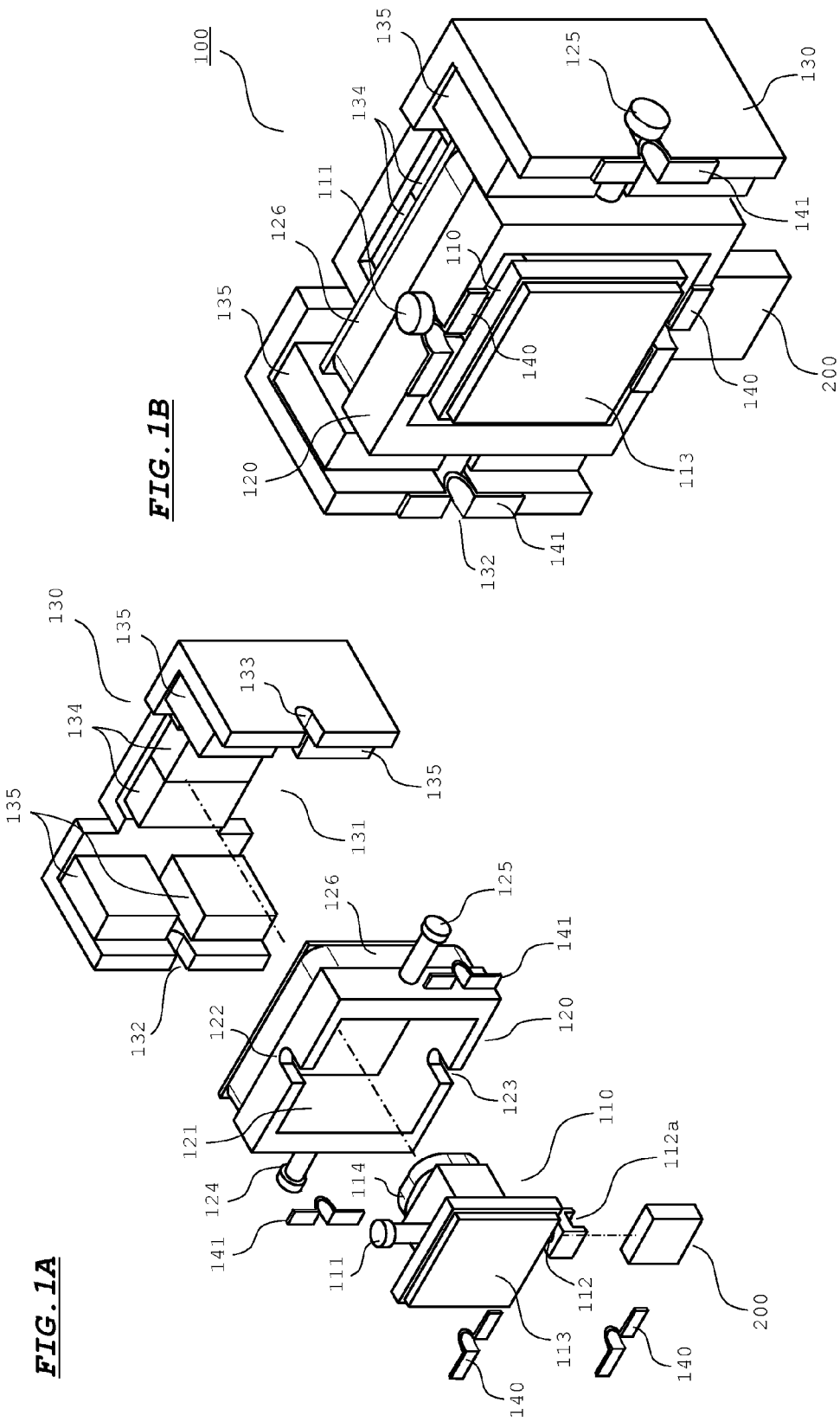

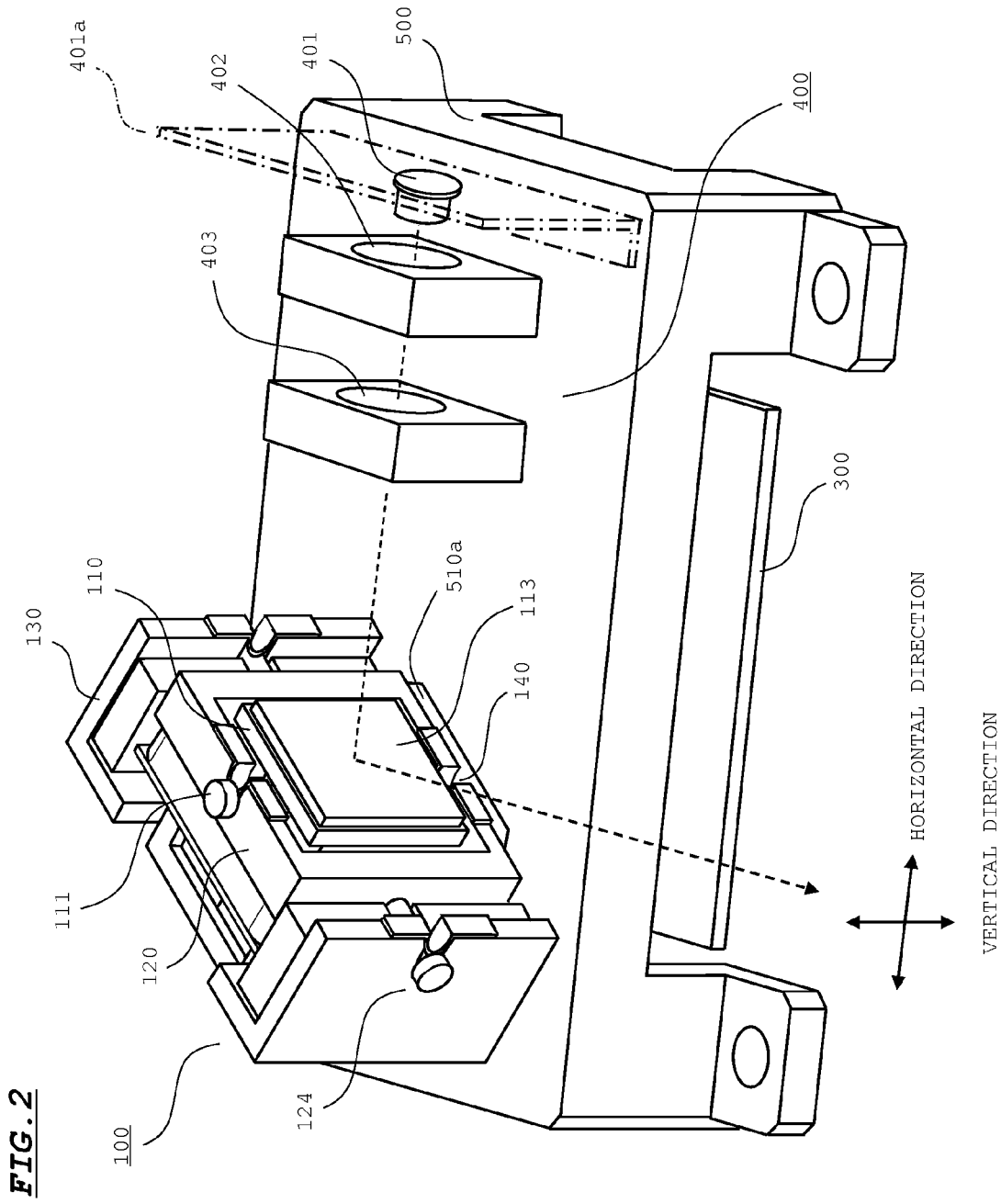

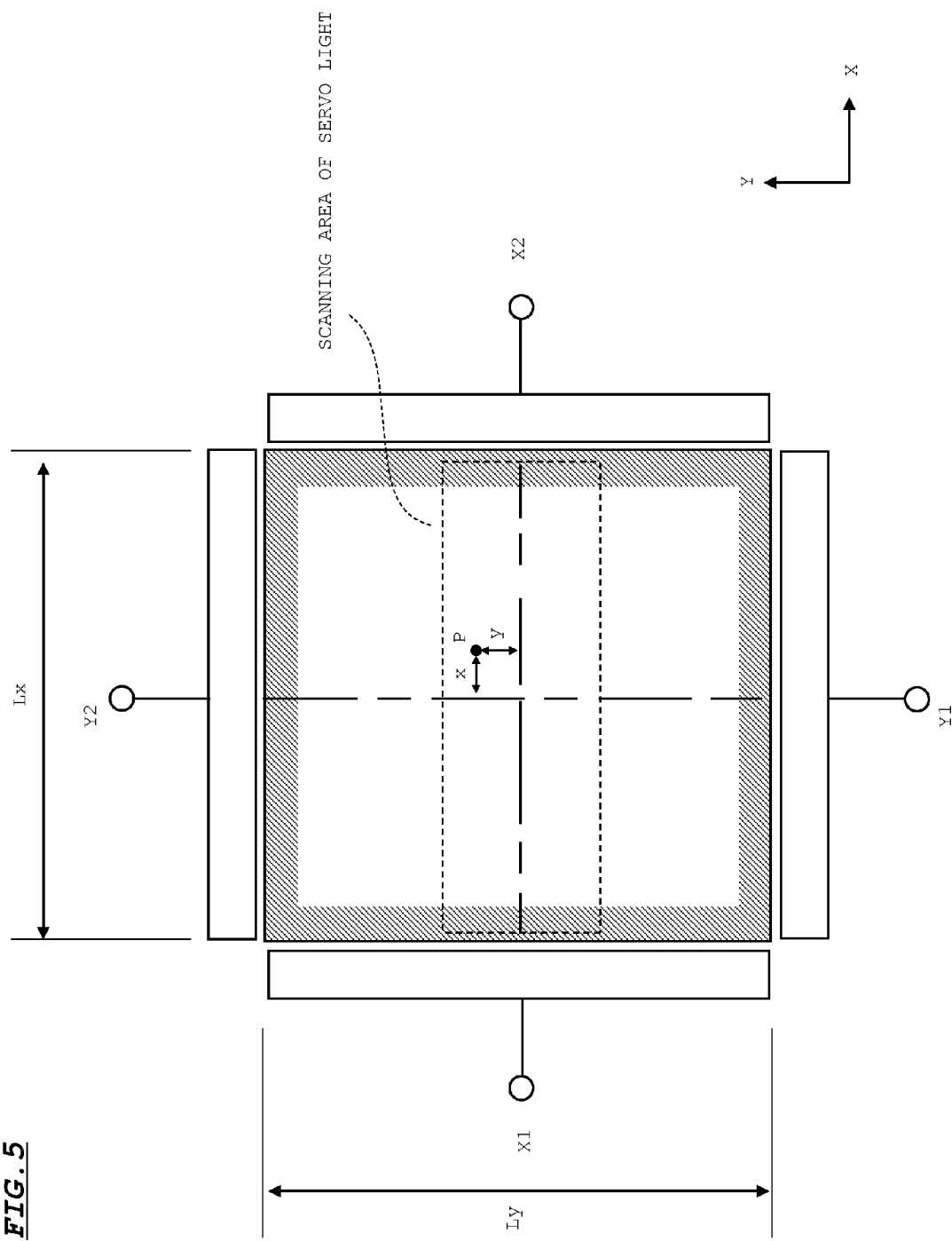

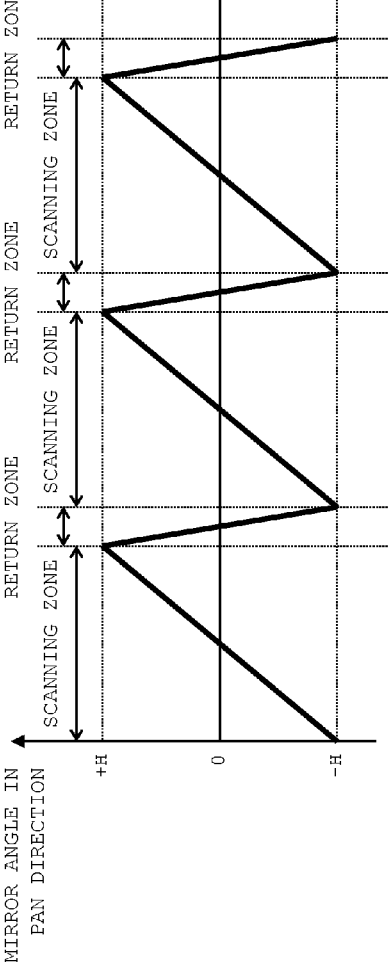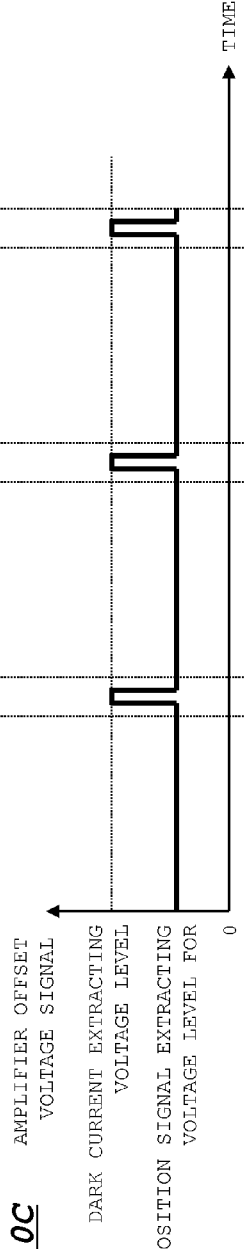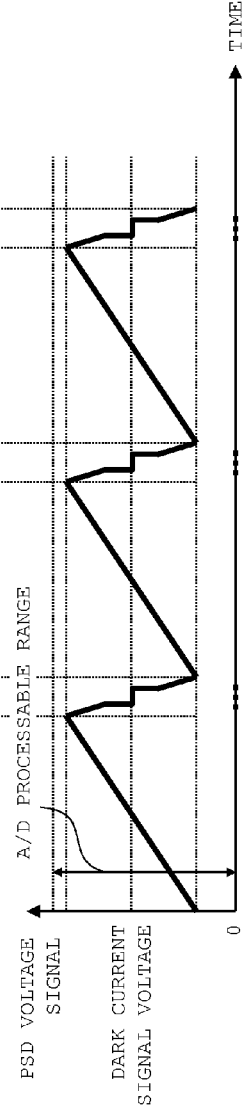

BEAM IRRADIATION DEVICE

This application claims priority under 35 U.S.C. Section 119 of Japanese Patent Application No. 2009-240804 filed Oct. 19, 2009, entitled "BEAM IRRADIATION DEVICE". The disclosure of the above application is incorporated herein by reference.

BACKGROUND OF THE INVENTION

1. Field of the Invention

The present invention relates to a beam irradiation device for irradiating laser light onto a targeted area, and more particularly to a beam irradiation device to be loaded in a so-called laser radar system for detecting presence or absence of an obstacle or a distance to the obstacle in a targeted area, based on reflection light obtained by irradiating laser light onto the targeted area.

2. Disclosure of Related Art

In recent years, a laser radar system for irradiating laser light in a forward direction with respect to a driving direction to detect presence or absence of an obstacle or a distance to the obstacle in a targeted area, based on a state of reflection light of the laser light, has been loaded in a family automobile or the like to enhance security in driving. Generally, the laser radar system is so configured as to scan a targeted area with laser light to detect presence or absence of an obstacle at each of scanning positions, based on presence or absence of reflection light at each of the scanning positions. The laser radar system is also configured to detect a distance to the obstacle at each of the scanning positions, based on a required time from an irradiation timing of laser light to a light receiving timing of reflection light at each of the scanning positions.

It is necessary to properly scan a targeted area with laser light, and properly detect each of scanning positions of laser light to enhance detection precision of the laser radar system. As an arrangement for scanning a targeted area with laser light, it is possible to employ an arrangement for driving a mirror about two axes. In the scan mechanism having the above arrangement, laser light is entered into the mirror obliquely with respect to a horizontal direction. Driving the mirror about two axes in a horizontal direction and a vertical direction allows for laser light to scan the targeted area.

In the scan mechanism having the above arrangement, a scanning position of laser light in a targeted area has a one-to-one correspondence to a pivotal position of a mirror. Accordingly, the scanning position of laser light can be detected by detecting the pivotal position of the mirror.

In the above arrangement, the pivotal position of the mirror can be detected by causing servo light to scan over a photodetector (PSD: Position Sensitive Detector) in accordance with movement of the mirror. The pivotal position of the mirror is detected by detecting an incident position of servo light on the photodetector, based on a signal to be outputted from the photodetector, whereby the scanning position of laser light in a target area is detected.

A dark current is superimposed on a signal to be outputted from the photodetector, due to a characteristic of the photodetector. The magnitude of a dark current changes depending on a use state (e.g. an ambient temperature of the photodetector) or a like condition. Since such a dark current may deteriorate position detection precision of the photodetector, it is desirable to properly correct a signal to be outputted from the photodetector by detecting the dark current.

However, since the magnitude of a dark current is considerably small, as compared with a signal to be outputted from the photodetector at the time of turning on of servo light, it is difficult or impossible to properly detect the dark current which is superimposed on a signal to be outputted from the photodetector, depending on an existing circuit configuration, with the result that it may be impossible to obtain a position detection signal free of a dark current with high precision.

SUMMARY OF THE INVENTION

A beam irradiation device according to a main aspect of the invention includes a laser light which emits laser light; an actuator which causes the laser light to scan a targeted area; a servo optical system which changes a propagating direction of servo light in accordance with driving of the actuator; a photodetector which receives the servo light and outputs a detection signal depending on a light receiving position of the servo light; a signal processing section which obtains the light receiving position based on the detection signal; and a control section which controls the laser light source and the actuator based on the light receiving position obtained by the signal processing section. In the above arrangement, the signal processing section includes an A/D conversion circuit which converts the detection signal into a digital signal; an error signal adjusting circuit which converts an error component signal to be outputted from the photodetector when the photodetector is inoperative to receive the servo light into a signal within a processable range of the A/D conversion circuit, and supplies the converted signal to the A/D conversion circuit; and a signal computing circuit which corrects a first digital signal derived from the detection signal with a second digital signal derived from the error component signal to obtain the light receiving position.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams showing an arrangement of a mirror actuator in an embodiment of the invention.

FIG. 2 is a diagram showing an optical system in a beam irradiation device in the embodiment.

FIG. 5 is a diagram for describing a method for generating a position detection signal in the embodiment.

FIGS. 10A through 10D are diagrams showing changes in signals in the embodiment.

Figure 3A:
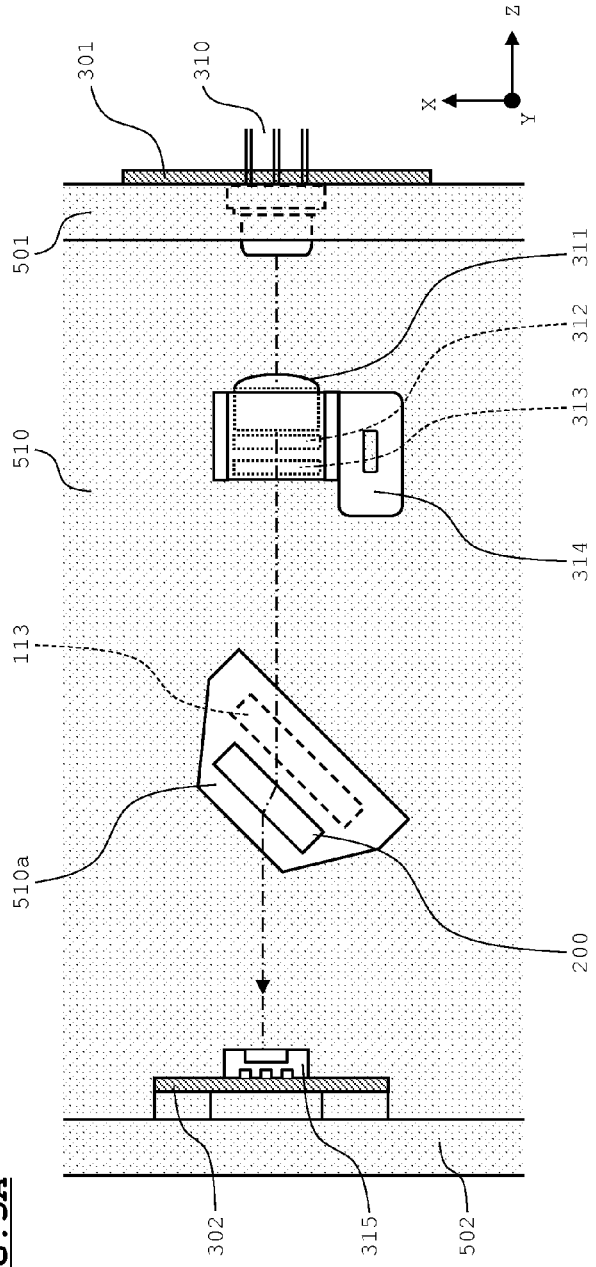
FIGS. 3A and 3B are diagrams showing the optical system in the beam irradiation device in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Level adjusting circuits 2 through 5, an A/D conversion circuit 41, a memory 6a, and a signal computing circuit 6b in the embodiment correspond to a signal processing section in the claims. A control circuit 6 in the embodiment corresponds to a control section in the claims. A voltage level generating circuit 33 for extracting a dark current, and a switching circuit 34 in the embodiment correspond to an error signal adjusting circuit in the claims. An I/V conversion former amplifier 31, a voltage level generating circuit 32 for extracting a position signal, a switching circuit 34, and a latter amplifier 35 in the embodiment correspond to a range adjusting circuit in the claims.

FIGS. 1A and 1B are diagrams showing an arrangement of a mirror actuator 100 in an embodiment of the invention. FIG. 1A is an exploded perspective view of the mirror actuator 100, and FIG. 1B is a perspective view of the mirror actuator 100 in an assembled state.

Referring to FIG. 1A, the reference numeral 110 indicates a mirror holder. The mirror holder 110 is formed with a support shaft 111 having a retainer at an end thereof, and a support shaft 112 having a bracket portion 112a at an end thereof. The bracket portion 112a has a recess of a size substantially equal to a thickness of a transparent member 200, and an upper part of the transparent member 200 is mounted in the recess. A flat plate-shaped mirror 113 is mounted on a front surface of the mirror holder 110, and a coil 114 is mounted on a rear surface thereof. The coil 114 is wound in a rectangular shape.

As described above, the transparent member 200 of a parallel flat plate shape is mounted on the support shaft 112 through the bracket portion 112a. In this example, the transparent member 200 is mounted on the support shaft 112 in such a manner that two flat surfaces of the transparent member 200 are aligned in parallel to a mirror surface of the mirror 113.

The reference numeral 120 indicates a movable frame which pivotally supports the mirror holder 110 about axes of the support shafts 111 and 112. The movable frame 120 is formed with an opening 121 for accommodating the mirror holder 110 therein, and also with grooves 122 and 123 to be engaged with the support shafts 111 and 112 of the mirror holder 110. Support shafts 124 and 125 each having a retainer at an end thereof are formed on side surfaces of the movable frame 120, and a coil 126 is mounted on a rear surface of the movable frame 120. The coil 126 is wound in a rectangular shape.

The reference numeral 130 indicates a fixed frame which pivotally supports the movable frame 120 about axes of the support shafts 124 and 125. The fixed frame 130 is formed with a recess 131 for accommodating the movable frame 120 therein, and also with grooves 132 and 133 to be engaged with the support shafts 124 and 125 of the movable frame 120. Magnets 134 for applying a magnetic field to the coil 114, and magnets 135 for applying a magnetic field to the coil 126 are mounted on inner surfaces of the fixed frame 130. The grooves 132 and 133 each extends from a front surface of the fixed frame 130 to a position in a clearance between the upper and lower two magnets 135.

The reference numeral 140 indicates a pressing plate for pressing the support shafts 111 and 112 in a rearward direction to prevent the support shafts 111 and 112 of the mirror holder 110 from disengaging from the grooves 122 and 123 of the movable frame 120. The reference numeral 141 indicates a pressing plate for pressing the support shafts 124 and 125 in the rearward direction to prevent the support shafts 124 and 125 of the movable frame 120 from disengaging from the grooves 132 and 133 of the fixed frame 130.

In the case where the mirror actuator 100 is assembled, the support shafts 111 and 112 of the mirror holder 110 are engaged in the grooves 122 and 123 of the movable frame 120, and the pressing plate 140 is mounted on a front surface of the movable frame 120 in such a manner as to press front surfaces of the support shafts 111 and 112. Accordingly, the mirror holder 110 is pivotally supported on the movable frame 120.

After the mirror holder 110 is mounted on the movable frame 120 in the above-described manner, the support shafts 124 and 125 of the movable frame 120 are engaged in the grooves 132 and 133 of the fixed frame 130, and the pressing plate 141 is mounted on the front surface of the fixed frame 130 in such a manner as to press front surfaces of the support shafts 124 and 125. Accordingly, the movable frame 120 is pivotally mounted on the fixed frame 130. Thus, the mirror actuator 100 is assembled.

As the mirror holder 110 is pivotally rotated with respect to the movable frame 120 about the axes of the support shafts 111 and 112, the mirror 113 is pivotally rotated. Further, as the movable frame 120 is pivotally rotated with respect to the fixed frame 130 about the axes of the support shafts 124 and 125, the mirror holder 110 is pivotally rotated, and as a result, the mirror 113 is pivotally rotated with the mirror holder 110. Thus, the mirror holder 110 is pivotally supported in a two-dimensional direction about the axes of the support shafts 111 and 112, and the support shafts 124 and 125 orthogonal to each other, and the mirror 113 is pivotally rotated in the two-dimensional direction in accordance with the pivotal rotation of the mirror holder 110. During the pivotal rotation, the transparent member 200 mounted on the support shaft 112 is also pivotally rotated in accordance with the pivotal rotation of the mirror 113.

In the assembled state shown in FIG. 1B, the positions and the polarities of the two magnets 134 are adjusted in such a manner that a force for pivotally rotating the mirror holder 110 about the axes of the support shafts 111 and 112 is generated by application of a current to the coil 114. Accordingly, in response to application of a current to the coil 114, the mirror holder 110 is pivotally rotated about the axes of the support shafts 111 and 112 by the electromagnetic driving force generated in the coil 114.

Further, in the assembled state shown in FIG. 1B, the positions and the polarities of the two magnets 135 are adjusted in such a manner that a force for pivotally rotating the movable frame 120 about the axes of the support shafts 124 and 125 is generated by application of a current to the coil 126. Accordingly, in response to application of a current to the coil 126, the movable frame 120 is pivotally rotated about the axes of the support shafts 124 and 125 by the electromagnetic driving force generated in the coil 126, and the transparent member 200 is pivotally rotated in accordance with the pivotal rotation of the movable frame 120.

FIG. 2 is a diagram showing an arrangement of an optical system in a state that the mirror actuator 100 is mounted.

Referring to FIG. 2, the reference numeral 500 indicates a base plate for supporting an optical system. The base plate 500 is formed with an opening 510a at a position where the mirror actuator 100 is installed. The mirror actuator 100 is mounted on the base plate 500 in such a manner that the transparent member 200 is received in the opening 510a.

An optical system 400 for guiding laser light to the mirror 113 is mounted on a top surface of the base plate 500. The optical system 400 includes a laser light source 401 (hereinafter, called as "scanning laser light"), and lens 402 and 403 for beam shaping. The laser light source 401 is mounted on a substrate 401a for a laser light source, and the substrate 401a is provided on the top surface of the base plate 500.

Laser light emitted from the laser light source 401 is subjected to convergence in a horizontal direction and a vertical direction by the lenses 402 and 403, respectively. The lenses 402 and 403 are designed in such a manner that the beam shape in a targeted area (e.g. an area defined at a position 100 m away in a forward direction from a beam exit port of a beam irradiation device) has predetermined dimensions (e.g. dimensions of about 2 m in the vertical direction and 1 m in the horizontal direction).

The lens 402 is a cylindrical lens having a lens function in the vertical direction, and the lens 403 is an aspherical lens for emitting scanning laser light as substantially parallel light. A beam emitted from a laser light source 401 has different divergence angles from each other in the vertical direction and the horizontal direction. The first lens 402 changes a ratio between divergence angles of laser light in the vertical direction and the horizontal direction. The second lens 403 changes magnifications of divergence angles (both in the vertical direction and the horizontal direction) of an emitted beam.

Scanning laser light transmitted through the lenses 402 and 403 is entered into the mirror 113 of the mirror actuator 100, and reflected on the mirror 113 toward a targeted area. The targeted area is scanned in the two-dimensional direction with the scanning laser light when the mirror 113 is two-dimensionally driven by the mirror actuator 100.

The mirror actuator 100 is disposed at such a position that scanning laser light from the lens 403 is entered into the mirror surface of the mirror 113 at an incident angle of 45 degrees with respect to the horizontal direction, when the mirror 113 is set to a neutral position. The term "neutral position" indicates a position of the mirror 113, wherein the mirror surface is aligned in parallel to the vertical direction, and scanning laser light is entered into the mirror surface at an incident angle of 45 degrees with respect to the horizontal direction.

A circuit board 300 is provided underneath the base plate 500. Further, circuit boards 301 and 302 are provided on a back surface and a side surface of the base plate 500.

FIG. 3A is a partial plan view of the base plate 500, viewed from the back side of the base plate 500. FIG. 3A shows a part of the back surface of the base plate 500, i.e. a vicinity of the position where the mirror actuator 100 is mounted.

As shown in FIG. 3A, walls 501 and 502 are formed on the periphery of the back surface of the base plate 500. A flat surface 510 lower than the walls 501 and 502 is formed in a middle portion of the back surface of the base plate 500 with respect to the walls 501 and 502. The wall 501 is formed with an opening for receiving a semiconductor laser 310. The circuit board 301 loaded with the semiconductor laser 310 is attached to an outer side surface of the wall 501 in such a manner that the semiconductor laser 310 is received in the opening of the wall 501. Further, the circuit board 302 loaded with a PSD 315 is attached to a position near the wall 502.

A light collecting lens 311, an aperture 312, and a ND (neutral density) filter 313 are mounted on the flat surface 510 on the back surface of the base plate 500 by an attachment member 314. The flat surface 510 is formed with an opening 510a, and the transparent member 200 mounted on the mirror actuator 100 is projected from the back surface of the base plate 500 through the opening 510a. In this example, when the mirror 113 of the mirror actuator 100 is set to the neutral position, the transparent member 200 is set to such a position that the two flat surfaces of the transparent member 200 are aligned in parallel to the vertical direction, and are inclined with respect to an optical axis of emission light from the semiconductor laser 310 by 45 degrees.

Laser light (hereinafter, called as "servo light") emitted from the semiconductor laser 310 transmitted through the light collecting lens 311 has the beam diameter thereof reduced by the aperture 312, and has the light intensity thereof reduced by the ND filter 313. Thereafter, the servo light is entered into the transparent member 200, and subjected to refraction by the transparent member 200. Thereafter, the servo light transmitted through the transparent member 200 is received by the PSD 315, which, in turn, outputs a position detection signal depending on a light receiving position of servo light.

Figure 3B:
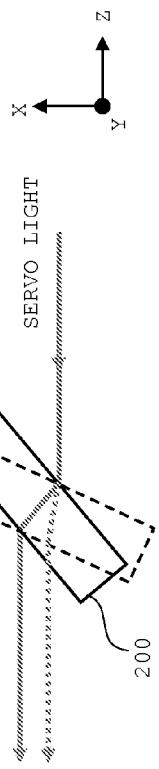

FIG. 3B is a diagram schematically showing how the pivotal position of the transparent member 200 is detected by the PSD 315.

An emission position of servo light on the X-Y plane differs before and after incidence of servo light into the transparent member 200 by a refractive function of the transparent member 200 disposed with a certain inclination with respect to the optical axis of laser light. If the transparent member 200 is pivotally moved in the direction of the arrow shown in FIG. 3B, the optical path of servo light is changed from the state indicated by the dotted line in FIG. 3B to the state indicated by the solid line in FIG. 3B, and the light receiving position of servo light on the PSD 315 is changed. This enables to detect the pivotal position of the transparent member 200, based on a light receiving position of servo light to be detected by the PSD 315.

Figure 4B:
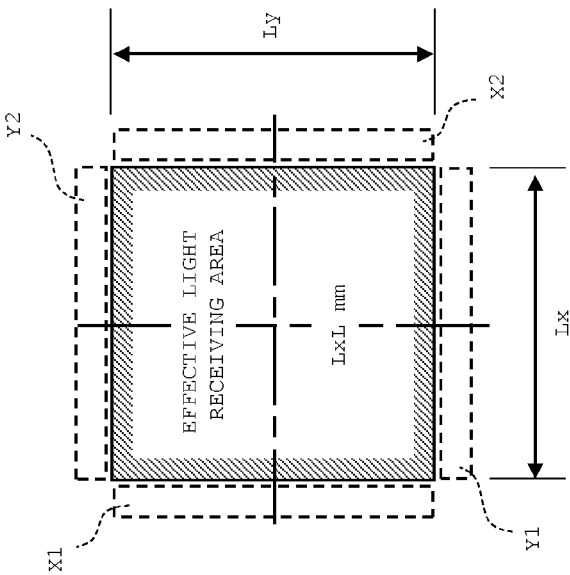
FIGS. 4A and 4B are diagrams showing an arrangement of a PSD in the embodiment.
Figure 4A:
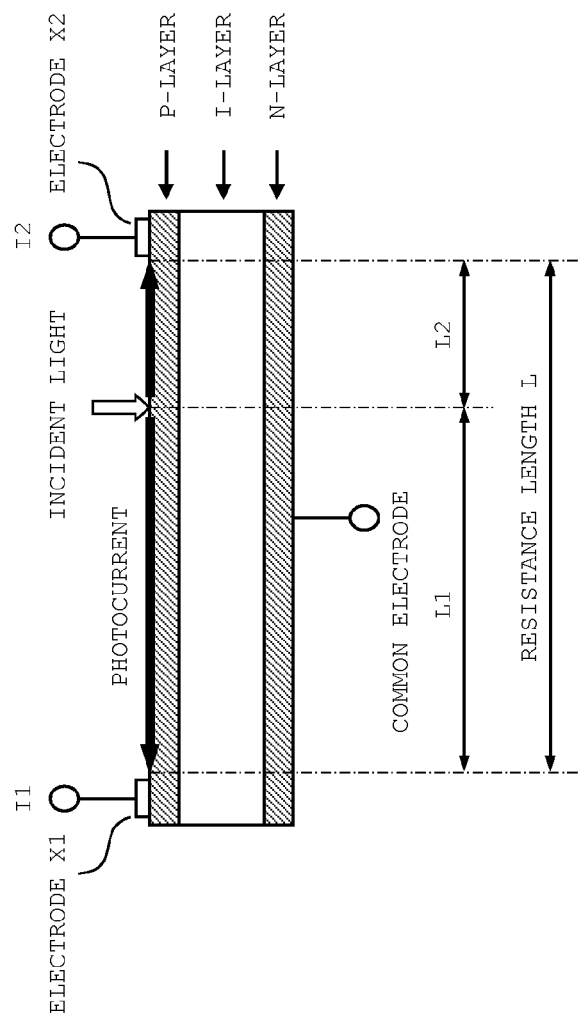

FIG. 4A is a diagram (a side sectional view) showing an arrangement of the PSD 315, and FIG. 4B is a diagram showing a light receiving surface of the PSD 315.

Referring to FIG. 4A, the PSD 315 has such a structure that a P-type resistive layer serving as a light receiving surface and a resistive layer is formed on a surface of an N-type high resistive silicon substrate. Electrodes X1 and X2 for outputting a photocurrent in the horizontal direction on the plane of FIG. 4B, and electrodes Y1 and Y2 (not shown in FIG. 4A) for outputting a photocurrent in the vertical direction on the plane of FIG. 4B are formed on a surface of the resistive layer. A common electrode is formed on the back surface of the substrate.

When laser light is irradiated onto the light receiving surface of the substrate, an electric charge proportional to a light amount is generated at an irradiated position of the light receiving surface. The electric charge is received by the resistive layer as a photocurrent, and the photocurrent is divided in inverse proportion to a distance to the respective corresponding electrodes, and outputted from the electrodes X1, X2, Y1, and Y2. In this example, currents to be outputted from the electrodes X1, X2, Y1, and Y2 each has a magnitude obtained by dividing a photocurrent in inverse proportion to a distance from the laser light irradiated position to the respective corresponding electrodes. Thus, the light irradiated position on the light receiving surface can be detected, based on current values to be outputted from the electrodes X1, X2, Y1, and Y2.

For instance, let it be assumed that servo light is irradiated to a position P in FIG. 5. In this case, a coordinate (x,y) of the position P, with a center position of the light receiving surface being defined as a reference point, is calculated by e.g. the following equations (1) and (2):

$$\frac{Ix2 - Ix1}{Ix2 + Ix1} = \frac{2x}{Lx} \quad (1)$$

$$\frac{Iy2 - Iy1}{Iy2 + Iy1} = \frac{2y}{Ly} \quad (2)$$

where Ix1, Ix2, Iy1, and Iy2 are amounts of current to be outputted from the electrodes X1, X2, Y1, and Y2, respectively, and Lx and Ly are distances between the electrodes in X direction and Y direction, respectively.

Figure 6:
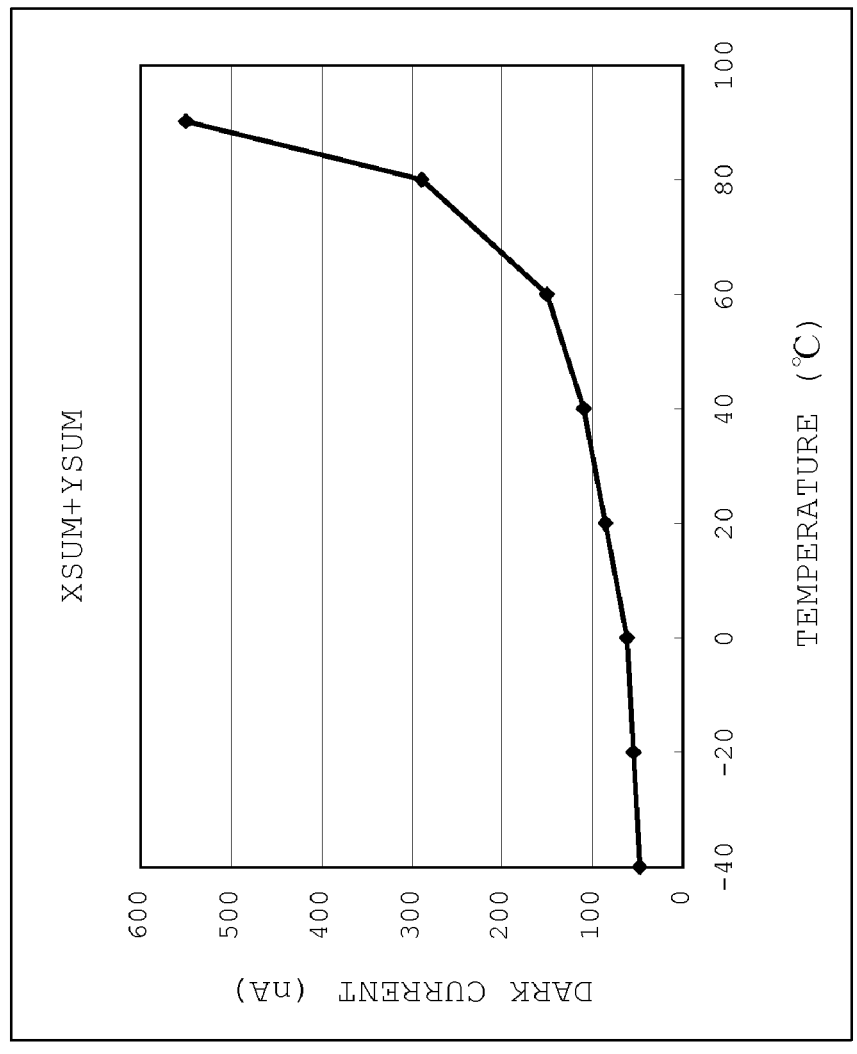
FIG. 6 is a diagram exemplarily showing a relation between the sum of dark currents which superimpose on current signals, and an ambient temperature of a PSD.

FIG. 6 is a diagram exemplarily showing a relation between the sum (XSUM+YSUM) of dark currents which superimpose on the current signals Ix1, Ix2, Iy1, and Iy2; and an ambient temperature of the PSD 315. In the measurement of this embodiment, an inverse bias voltage of the PSD is set to 1V. As shown in FIG. 6, the sum of dark currents is increased, as the ambient temperature of the PSD 315 is increased.

Assuming that dark currents Δ are superimposed on the current signals Ix1, Ix2, Iy1, and Iy2 to be outputted from the electrodes, the values of x' and y' which indicate the coordinate of an irradiation position of servo light in this case are calculated by the following equations (3) and (4).

$$\frac{Ix2 - Ix1}{Ix2 + Ix1 + 2\Delta} = \frac{2x'}{Lx} \quad (3)$$

$$\frac{Iy2 - Iy1}{Iy2 + Iy1 + 2\Delta} = \frac{2y'}{Ly} \quad (4)$$

As is clear from the equations (3) and (4), the absolute values of a position detection signal indicating an X-direction position (2x'/Lx) and a Y-direction position (2y'/Ly) when a dark current is superimposed are respectively smaller than the absolute values of a position detection signal indicating an X-direction position (2x/Lx) and a Y-direction position (2y/Ly) when a dark current is not superimposed. Specifically, the irradiation position of servo light when a dark current is superimposed is detected at a position closer to the origin than the irradiation position of servo light when a dark current is not superimposed. In this way, if a dark current is increased resulting from an increase in the ambient temperature of the PSD 315, precision of a position detection signal may be lowered. In view of this, in this embodiment, the circuit configuration of a beam irradiation device is configured as follows to thereby suppress a dark current which is superimposed on a position detection signal.

Figure 7:
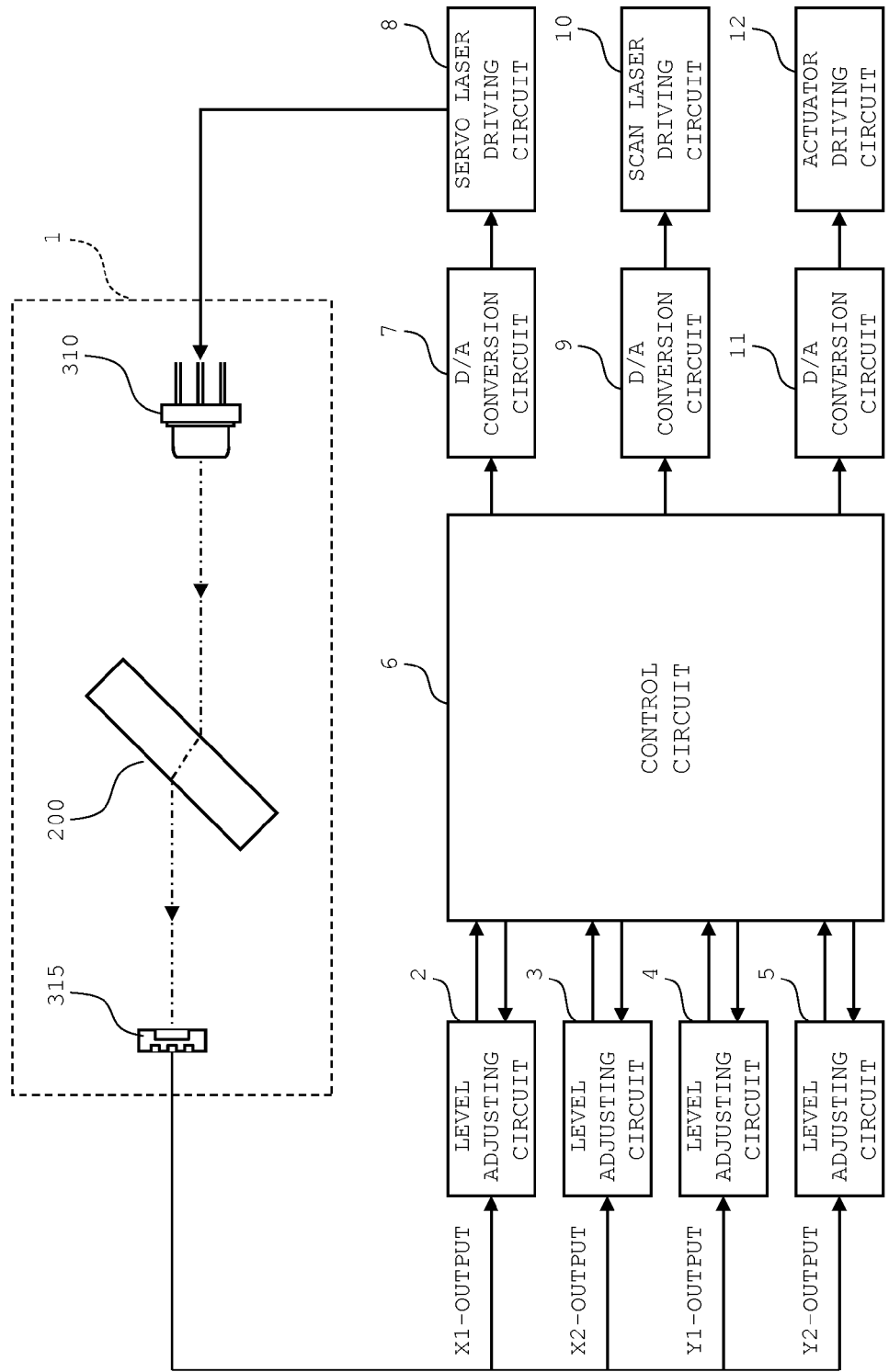
FIG. 7 is a diagram showing a circuit configuration of the beam irradiation device in the embodiment.

FIG. 7 is a diagram showing a circuit configuration of a beam irradiation device in accordance with this embodiment. To simplify the description, primary components of the servo optical system 1 shown in FIG. 3A are shown in FIG. 7.

As shown in FIG. 7, the beam irradiation device is provided with level adjusting circuits 2 through 5, a control circuit 6, D/A conversion circuits 7, 9, and 11, a servo laser driving circuit 8, a scan laser driving circuit 10, and an actuator driving circuit 12.

In the servo optical system 1, servo light emitted from the semiconductor laser 310 is refracted by the transparent member 200 as described above, and then, is entered into the light receiving surface of the PSD 315. With this configuration, the current signals Ix1, Ix2, Iy1, and Iy2 (current signals to be outputted from the electrodes X1, X2, Y1, and Y2 shown in FIG. 5) corresponding to the light receiving position of servo light are outputted to the PSD 315, and are respectively inputted to the level adjusting circuits 2 through 5.

The level adjusting circuits 2 through 5 convert the current signals Ix1, Ix2, Iy1, and Iy2 to be outputted from the electrodes X1, X2, Y1, and Y2 into respective voltage signals, and as will be described later, amplify the voltage signals and output the amplified voltage signals to the control circuit 6. The configurations of the level adjusting circuits 2 through 5 will be described later referring to FIG. 8.

The control circuit 6 generates a signal indicating the light receiving position of servo light based on the computation described referring to FIG. 5, using the voltage signals to be outputted from the level adjusting circuits 2 through 5. Further, the control circuit 6 performs switching operations of switching circuits provided in the level adjusting circuits 2 through 5, which will be described later.

Further, the control circuit 6 detects a scanning position of laser light in a target area, based on the generated position detection signal indicating the light receiving position of servo light, and executes e.g. driving control of the mirror actuator 100 and driving control of the laser light source 401. Specifically, the control circuit 6 outputs, to the scan laser driving circuit 10 through the D/A conversion circuit 9, a pulse driving signal at a timing when the scanning position of scan laser light in a target area has reached a predetermined position. With this configuration, the laser light source 401 emits pulse light to irradiate the target area with laser light. Further, the control circuit 6 outputs, to the actuator driving circuit 12 through the D/A conversion circuit 11, a servo signal which causes the scanning position of scan laser light in the target area to follow a predetermined trajectory. Upon receiving the servo signal, the actuator driving circuit 12 drives the mirror actuator 100 to cause scan laser light to scan the target area while following the predetermined trajectory.

Further, the control circuit 6 outputs a control signal to the servo laser driving circuit 8 through the D/A conversion circuit 7. With this configuration, the semiconductor laser 310 in the servo optical system 1 emits laser light at a constant power level.

Figure 8:
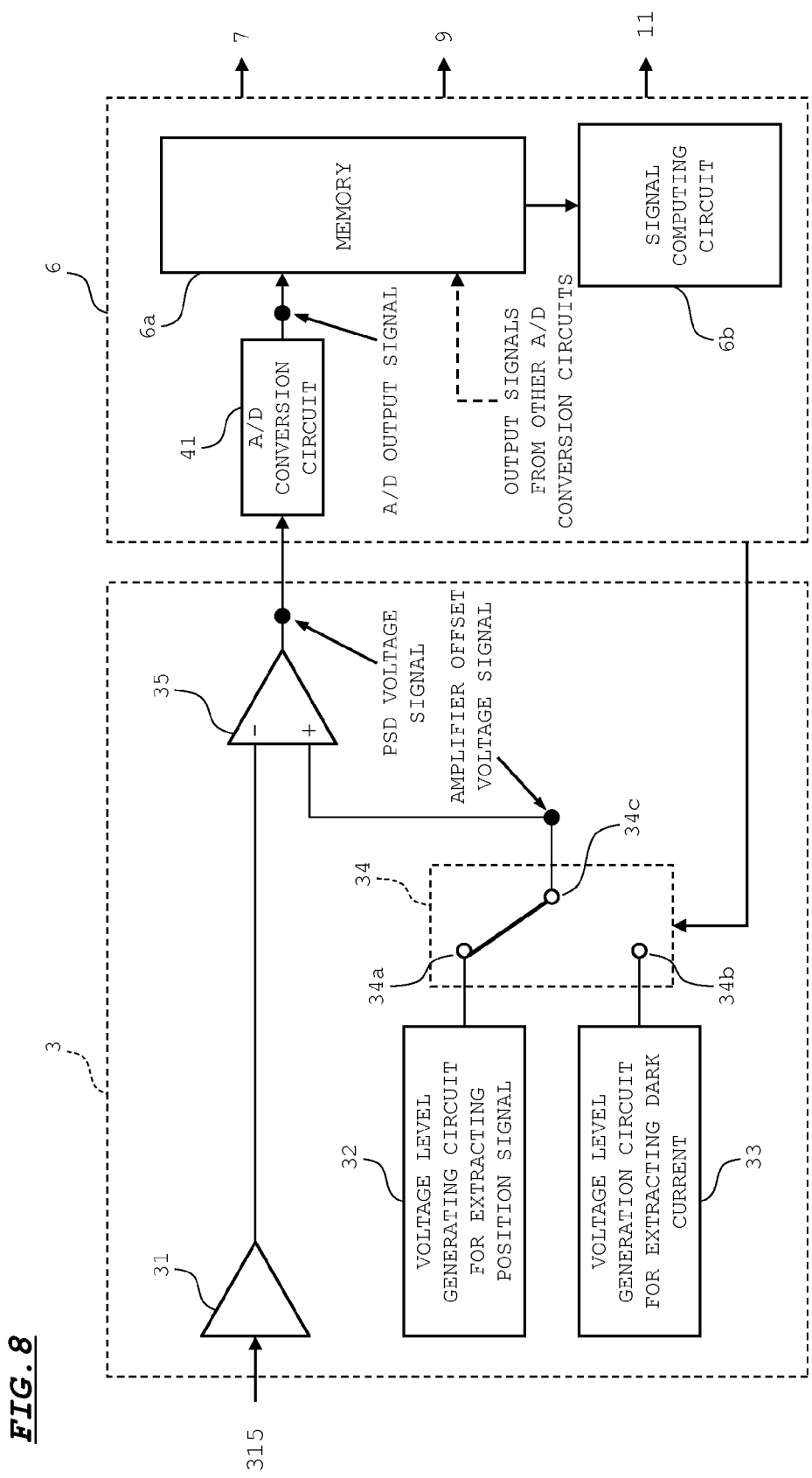
FIG. 8 is a diagram showing a level adjusting circuit and a control circuit in the embodiment.

Next, the configurations of the level adjusting circuits 2 through 5, and the control circuit 6 are described referring to FIG. 8. To simplify the description, FIG. 8 shows the configuration of the level adjusting circuit 3 for processing a signal from the electrode X2 shown in FIG. 5. The configurations of the level adjusting circuits 2, 4, and 5 are the same as the configuration of the level adjusting circuit 3. Further, the signals from the level adjusting circuits 2, 4, and 5 are processed in the same manner as the signal from the level adjusting circuit 3 by the control circuit 6. Furthermore, switching circuits in the level adjusting circuits 2, 4, and 5 are switched in the same manner as a switching circuit 34 provided in the level adjusting circuit 3 shown in FIG. 8. In the following, description is made concerning the level adjusting circuit 3, and description on the level adjusting circuits 2, 4, and 5 is omitted herein.

As shown in FIG. 8, the level adjusting circuit 3 has an I/V conversion former amplifier 31, a voltage level generating circuit 32 for extracting a position signal, a voltage level generating circuit 33 for extracting a dark current, the switching circuit 34, and a latter amplifier 35. The control circuit 6 has an A/D conversion circuit 41, a memory 6a, and a signal computing circuit 6b.

The I/V conversion former amplifier 31 converts the current signal Ix2 to be outputted from the electrode X2 of the PSD 315 into a voltage signal; and sums up the voltage signal and a predetermined offset voltage, and outputs the summation voltage to the latter amplifier 35. The voltage level generating circuit 32 for extracting a position signal and the voltage level generating circuit 33 for extracting a dark current respectively output predetermined voltage signals, and are respectively connected to terminals 34a and 34b of the switching circuit 34. The voltage level generating circuit 32 for extracting a position signal is a power source circuit to be used when servo light is turned on. The voltage level generating circuit 33 for extracting a dark current is a power source circuit to be used when servo light is turned off.

The switching circuit 34 has the terminals 34a, 34b, and a terminal 34c. The switching circuit 34 switches between a state (hereinafter, called as a "connection state for extracting a position signal) that the terminals 34a and 34c are connected, and a state (hereinafter, called as a "connection state for extracting a dark current") that the terminals 34b and 34c are connected, based on a signal from the control circuit 6. When the connection state of the switching circuit 34 is set to the connection state for extracting a position signal, a voltage signal to be outputted from the voltage level generating circuit 32 for extracting a position signal is outputted to the latter amplifier 35. When the connection state of the switching circuit 34 is set to the connection state for extracting a dark current, a voltage signal to be outputted from the voltage level generating circuit 33 for extracting a dark current is outputted to the latter amplifier 35. Hereinafter, a voltage signal to be outputted from the terminal 34c is called as an "amplifier offset voltage signal".

The latter amplifier 35 amplifies a voltage signal to be outputted from the I/V conversion former amplifier 31, and shifts the level of the amplified voltage signal based on an amplifier offset voltage signal, and outputs the level-shifted voltage signal to the control circuit 6. Hereinafter, a voltage signal to be outputted from the latter amplifier 35 is called as a "PSD voltage signal".

A PSD voltage signal is inputted to the A/D conversion circuit 41 in the control circuit 6. The A/D conversion circuit 41 converts the PSD voltage signal into a digital signal, and outputs the digital signal to the memory 6a. Hereinafter, a voltage signal to be outputted from the A/D conversion circuit 41 is called as an "A/D output signal".

In the above arrangement, voltage signals to be outputted from the I/V conversion former amplifier 31, the latter amplifier 35, and the voltage level generating circuit 32 for extracting a position signal are adjusted so that the A/D conversion circuit 41 is allowed to efficiently convert a PSD voltage signal into a digital signal, when the connection state of the switching circuit 34 is set to the connection state for extracting a position signal. Specifically, as shown in FIG. 9A, voltage signals to be outputted from the I/V conversion former amplifier 31, the latter amplifier 35, and the voltage level generating circuit 32 for extracting a position signal are adjusted so that a variation range Va of a PSD voltage signal, which has been generated through the I/V conversion former amplifier 31 and the latter amplifier 35 based on the current signal Ix2, is included in a processable range Vb of the A/D conversion circuit 41, in the case where the current signal Ix2 to be outputted from the electrode X2 of the PSD 315 varies within a variation range Ia. With this configuration, since the resolution performance of the A/D conversion circuit 41 is efficiently utilized, it is possible to precisely convert a PSD voltage signal into a digital signal to thereby enhance position detection precision of servo light to be entered into the PSD 315.

In the case where servo light is turned off while a voltage signal to be outputted from the voltage level generating circuit 32 for extracting a position signal is inputted to the latter amplifier 35, and a dark current is inputted to the I/V conversion former amplifier 31, as shown in FIG. 9A, a variation range Ic of the dark current is greatly away from the variation range Ia of the current signal Ix2. Accordingly, a variation range Vc of a voltage signal (PSD voltage signal) corresponding to the dark current, which is outputted from the latter amplifier 35, may be deviated from the processable range Vb of the A/D conversion circuit 41. As a result, the voltage signal (PSD voltage signal) corresponding to the dark current may not be processed by the A/D conversion circuit 41.

In view of the above, in this embodiment, in the case where a voltage signal corresponding to a dark current is detected, the connection state of the switching circuit 34 is set to the connection state for extracting a dark current, and an amplifier offset voltage signal to be inputted to the latter amplifier 35 is adjusted to a magnitude corresponding to the dark current. With this configuration, when servo light is turned off, in other words, when a dark current is outputted, as shown in FIG. 9A, the variation range Vc of a PSD voltage signal is shifted to a range Vc' by an offset operation using a voltage signal (amplifier offset voltage signal) from the voltage level generating circuit 33 for extracting a dark current so that the shifted range Vc' is included in the processable range Vb of the A/D conversion circuit 41. With this configuration, it is possible to detect a voltage signal corresponding to a dark current.

Referring back to FIG. 8, a voltage signal to be outputted from the A/D conversion circuit 41 and voltage signals to be outputted from three A/D conversion circuits (not shown) corresponding to the level adjusting circuits 2, 4, and 5 are inputted to the memory 6a. In this arrangement, voltage signals (Vx1a, Vx2a, Vy1a, and Vy2a) to be outputted from the four A/D conversion circuits when the connection state of the respective switching circuits is set to the connection state for extracting a position signal, and voltage signals (Vx1b, Vx2b, Vy1b, and Vy2b) to be outputted from the four A/D conversion circuits when the connection state of the respective switching circuits is set to the connection state for extracting a dark current are individually stored in the memory 6a.

The signal computing circuit 6b generates voltage signals (Vx1, Vx2, Vy1, and Vy2) corresponding to the respective electrodes and whose dark current is suppressed, based on the voltage signals stored in the memory 6a. For instance, the voltage signal Vx1 corresponding to the electrode X1 is generated by correcting the voltage signal Vx1a with the voltage signal Vx1b in such a manner as to remove a dark current component.

Further, the signal computing circuit 6b generates a position detection signal indicating a light receiving position of servo light, based on the computations expressed by the aforementioned equations (1) and (2), using the voltage signals (Vx1, Vx2, Vy1, and Vy2) whose dark current is suppressed. The control circuit 6 controls the servo laser driving circuit 8, the scan laser driving circuit 10, and the actuator driving circuit 12 through the D/A conversion circuits 7, 9, and 11, based on the generated position detection signal.

Figure 9B:
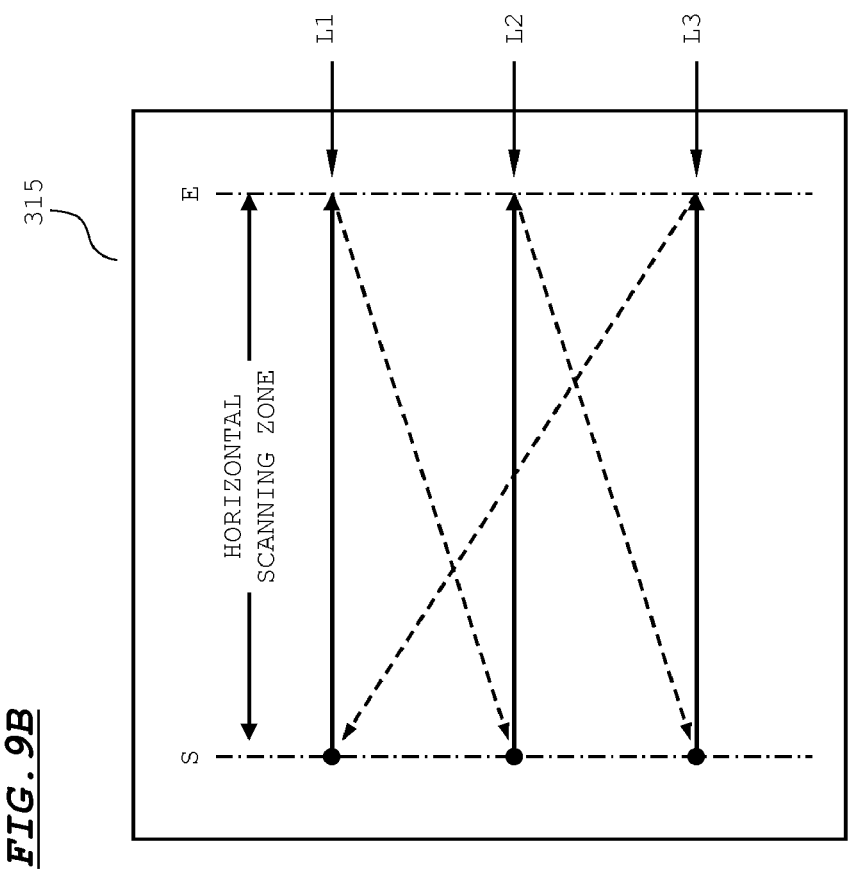
FIGS. 9A and 9B are a diagram for describing how a PSD voltage signal is adjusted, and a diagram schematically showing a scanning trajectory of servo light in the embodiment.
Figure 9A:
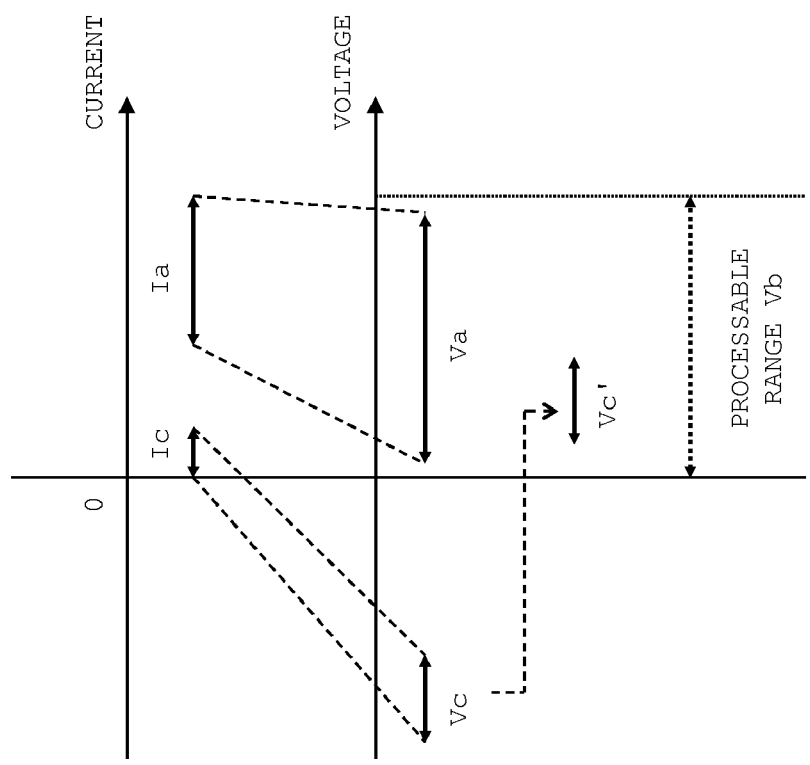

FIG. 9B is a diagram schematically showing a scanning trajectory of servo light on the light receiving surface of the PSD 315 when a targeted area is scanned with scan laser light.

This embodiment is described based on the premise that scan laser light scans a targeted area by three rows in a horizontal direction.

L1, L2, and L3 shown in FIG. 9B are scanning trajectories of servo light on the light receiving surface of the PSD 315, in the case where scan laser light scans the respective scanning lines of an upper row, an intermediate row, and a lower row in a targeted area. In FIG. 9B, a zone from a start position S to an end position E is a horizontal scanning zone corresponding to a search zone in the targeted area. In the scanning trajectory of each scanning line, servo light starts a scanning operation from the start position S of a horizontal scanning zone and scans to the end position E in a horizontal direction, and thereafter, is returned to the start position S of a succeeding scanning line.

In this embodiment, servo light is constantly kept in an on-state in a time zone when servo light scans the scanning lines L1 through L3 in a horizontal direction. On the other hand, in a time zone when servo light is inoperative to scan the scanning lines L1 through L3, in other words, while servo light is being returned from the end position E of the ongoing scanning line to the start position S of a succeeding scanning line, servo light which has been in an on-state is temporarily turned off. Further, the connection state of the switching circuit 34 is set to the connection state for extracting a dark current at a timing when servo light is temporarily turned off.

The timing at which servo light is temporarily turned off is set in a time zone when servo light is returned to the start position S of a succeeding scanning line for the following reason.

Since scan laser light scans a target area in a time zone when servo light scans the scanning lines L1 through L3, the scanning position of scan laser light is required to precisely follow a predetermined trajectory. In this operation, the control circuit 6 is required to output a servo signal to the actuator driving circuit 12 by constantly turning on servo light. On the other hand, in a time zone when servo light is returned to the start position S of a succeeding scanning line, as far as the scanning position of servo light coincides with the start position S of a succeeding scanning line at the end, it is not necessary to constantly keep the scanning precision of scan laser light high while servo light is being returned. Accordingly, in this embodiment, the timing when servo light is temporarily turned off is set in a time zone when servo light is being returned to the start position S to keep the scanning precision of scan laser light high.

FIGS. 10A through 10D are diagrams showing a relation between values of the each parameter in scanning with servo light, and a time. FIG. 10A is a diagram showing an angle of the mirror 113 in Pan direction (horizontal direction), FIG. 10B is a diagram showing an ON/OFF state of servo light, FIG. 10C is a diagram showing an amplifier offset voltage signal in the level adjusting circuit 3, and FIG. 10D is a diagram showing a PSD voltage signal to be outputted from the latter amplifier 35. The axes of abscissas (time axes) in FIGS. 10A through 10D are illustrated in a state that the each time axe coincide with each other.

As shown in FIG. 10A, the swing angle of the mirror 113 in Pan direction is changed between −H and +H, assuming that the swing angle is set to zero when the scanning position of servo light is in the middle position between the start position S and the end position E in FIG. 9B. With this configuration, as shown in FIG. 10B, servo light is temporarily turned off in a return zone.

In this embodiment, the return zone is set to about 9 ms, and an off-period of servo light is set to 1 ms or shorter. With this configuration, it is possible to detect a PSD voltage signal corresponding to a dark current even in a return zone while keeping the scanning precision of scan laser light high.

As described above, in this arrangement, the connection state of the switching circuit 34 is set to the connection state for extracting a position signal when servo light is turned on, and the connection state of the switching circuit 34 is set to the connection state for extracting a dark current when servo light is turned off. With this configuration, as shown in FIG. 10C, the amplifier offset voltage signal is set to a voltage level (position signal extracting voltage level) to be outputted from the voltage level generating circuit 32 for extracting a position signal when servo light is turned on, and is set to a voltage level (dark current extracting voltage level) to be outputted from the voltage level generating circuit 33 for extracting a dark current when servo light is turned off.

As shown in FIG. 10D, the PSD voltage signal in the level adjusting circuit 3 is changed in accordance with the swing angle of the mirror 113 when servo light is turned on. The level adjusting circuit 3 is configured to allow the variation range of the PSD voltage signal to be efficiently included in the processable range of the A/D conversion circuit 41, as described above.

In the above arrangement, if the connection state of the switching circuit 34 is set to the connection state for extracting a position signal when servo light is turned off, and the amplifier offset voltage signal is kept to the position signal extracting voltage level, as shown in FIG. 9A, the PSD voltage signal corresponding to a dark current may be deviated from the processable range of the A/D conversion circuit 41. If the PSD voltage signal corresponding to a dark current in the above case is converted into a digital signal by the A/D conversion circuit 41, the digital signal may be set to e.g. zero as shown by the bold dotted line in FIG. 10D, with the result that it may be impossible to accurately detect a voltage signal corresponding to the dark current. However, as described above, if the connection state of the switching circuit 34 is switched to the connection state for extracting a dark current in response to turning off of servo light, an amplifier offset voltage signal corresponding to the dark current is inputted to the latter amplifier 35 at the time when servo light is turned off. Accordingly, the PSD voltage signal corresponding to the dark current is shifted to a level near the level of the "dark current signal voltage" as shown in FIG. 10D by an offset operation, and the level-shifted signal is included in the processable range of the A/D conversion circuit 41. This enables to properly detect the PSD voltage signal corresponding to the dark current.

A PSD voltage signal corresponding to a dark current is subjected to A/D conversion each time a return zone is repeated, and the generated digital signals are stored in the memory 6a provided in the control circuit 6. In this case, it is possible to perform a processing of suppressing a dark current signal with respect to a PSD voltage signal in each of the scanning zones, based on a PSD voltage signal corresponding to a dark current which has been acquired in a preceding return zone. The above configuration, however, may deteriorate a PSD voltage signal in each of the scanning zones, depending on a processing of suppressing a dark current signal, if a large noise component is included in the PSD voltage signal corresponding to a dark current which has been acquired in the preceding return zone.

In order to avoid the above drawback, in this embodiment, a PSD voltage signal (digital signal) corresponding to a dark current is stored in the memory 6a for a certain number of return zones earlier than the timing immediately before a target scanning zone is scanned, and a PSD voltage signal in the target scanning zone is corrected by using a signal obtained by averaging these digital signals.

Figure 11:
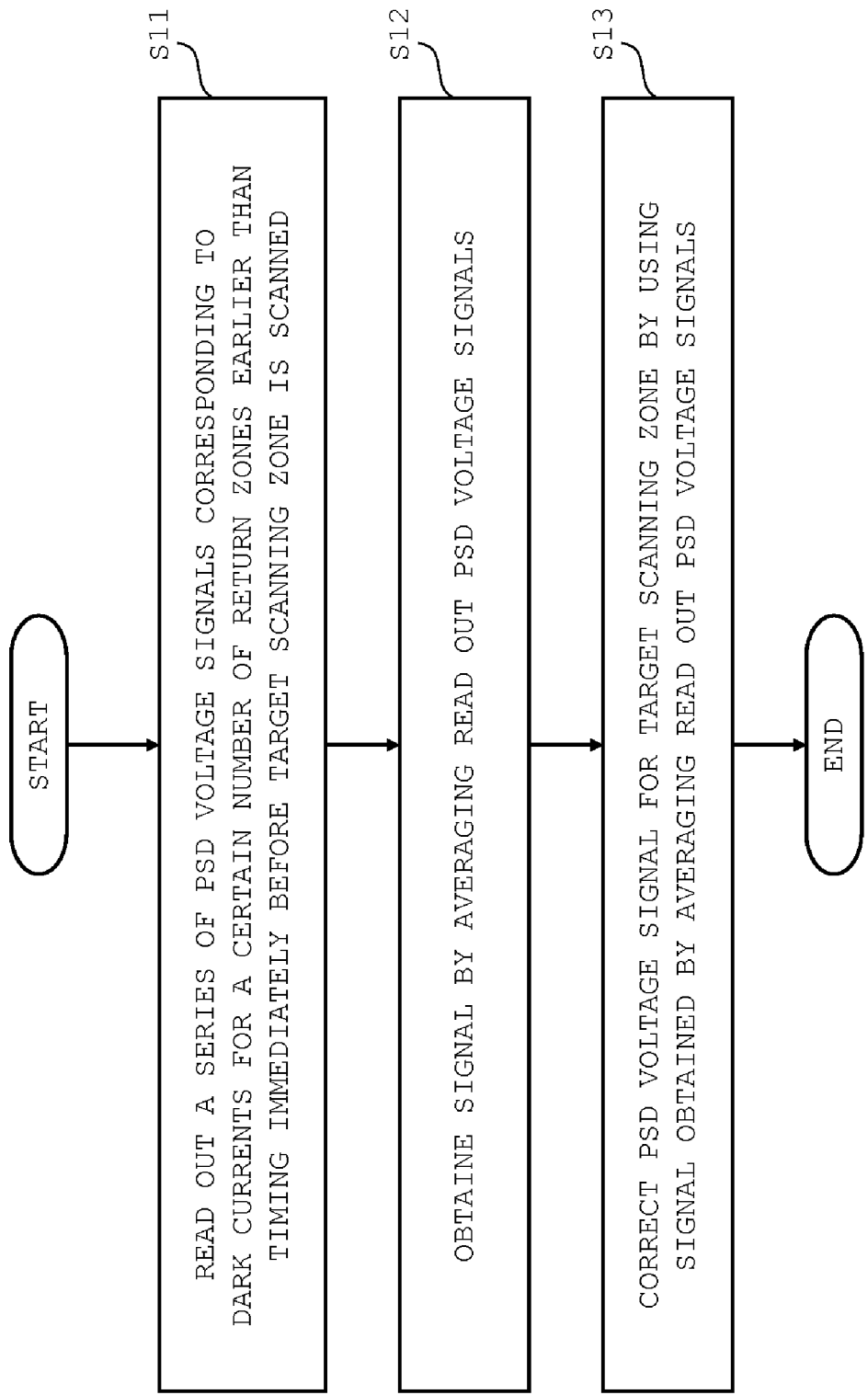
FIG. 11 is a flowchart showing an operation for correcting PSD voltage signal corresponding to a dark current in the embodiment.

FIG. 11 is a flowchart showing an operation for correcting the PSD voltage signal corresponding to the dark current.

First, the control circuit 6 reads out a series of PSD voltage signals corresponding to the dark currents for a certain number of return zones earlier than the timing immediately before a target scanning zone is scanned from the memory 6a (S11). Next, the control circuit 6 obtains a signal by averaging the series of PSD voltage signals read out in S11 process (S12). Then, a PSD voltage signal for the target scanning zone is corrected by using the signal obtained by averaging the series of PSD voltage signals (S13).

With this correcting operation, even if a large noise component is included in a PSD voltage signal corresponding to a dark current which has been acquired in a preceding return zone, it is possible to properly correct a PSD voltage signal in a target scanning zone to thereby suppress deterioration of position detection precision. It is possible to use a signal processed by other method for suppressing a noise component such as a least-square method, in place of the averaging processing.

Figure 12B:
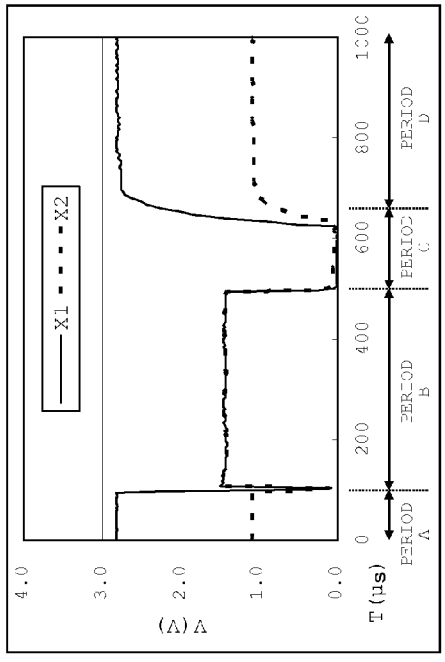
FIGS. 12A through 12D are diagrams showing changes in a PSD voltage signal in the embodiment.
Figure 12D:
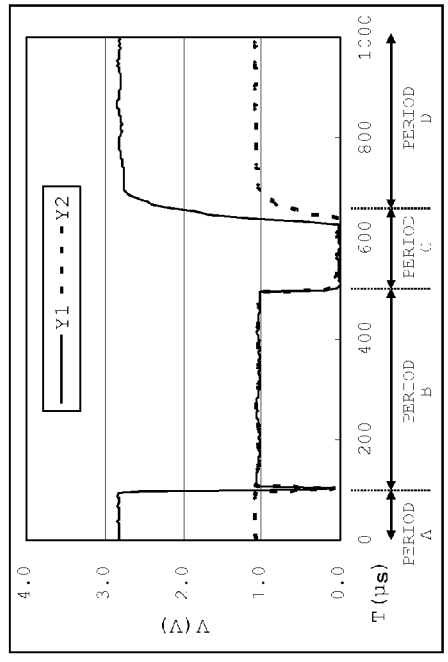
Figure 12A:
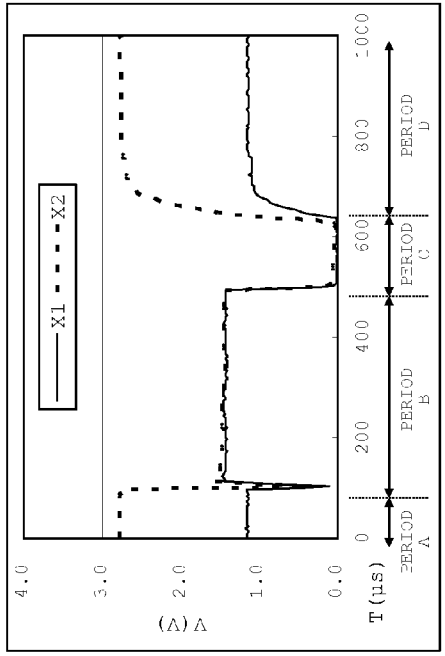
Figure 12C:
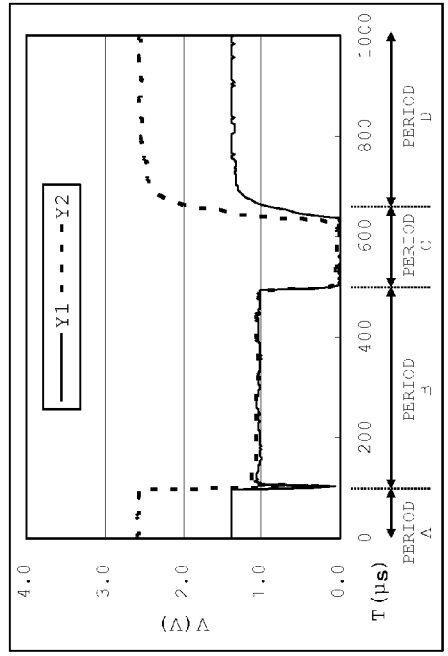

FIGS. 12A through 12D are diagrams showing measurement results, in the case where the arrangement of this embodiment is used. FIGS. 12A through 12D each shows a measurement value of a PSD voltage signal, in the case where servo light is entered into a predetermined position on the light receiving surface of the PSD 315. FIGS. 12A and 12B are diagrams showing PSD voltage signals corresponding to the electrodes X1 and X2, and FIGS. 12C and 12D are diagrams showing PSD voltage signals corresponding to the electrodes Y1 and Y2.

In FIGS. 12A and 12B, the incident positions of servo light are set to a middle position on the light receiving surface of the PSD 315 in Tilt direction (moving direction of servo light when the mirror 113 is vertically swung from the neutral position), and differ from each other in Pan direction (moving direction of servo light when the mirror 113 is horizontally swung from the neutral position). Further, in FIGS. 12C and 12D, the incident positions of servo light are set to a middle position on the light receiving surface of the PSD 315 in Pan direction, and differ from each other in Tilt direction. In FIGS. 12A through 12D, the axes of ordinate represent a voltage value, and the axes of abscissas represent an elapsed time.

Referring to FIGS. 12A through 12D, periods A, C, and D each represents a period when the connection state of the switching circuit 34 is set to the connection state for extracting a position signal, and when servo light is turned on; and a period B represents a period when the connection state of the switching circuit 34 is set to the connection state for extracting a dark current, and when servo light is turned off. The processable ranges of the A/D conversion circuits corresponding to the respective electrodes are each set from 0 to 4 (V).

As shown in FIGS. 12A through 12D, the levels of all the PSD voltage signals corresponding to each electrode in the periods A and D lie within the processable ranges of the A/D conversion circuits. Further, since PSD voltage signals corresponding to a dark current at each electrode in the period B are each set to about 1.4V in FIGS. 12A and 12B, and set to about 1.0V in FIGS. 12C and 12D, the levels of all the PSD voltage signals in the period B lie within the processable ranges of the A/D conversion circuits. With this configuration, it is possible to generate a position detection signal with high precision by correcting a dark current, based on PSD voltage signals corresponding to each electrode.

At a timing when the scanning operation is transited from the period B to the period C, the connection state of the switching circuit 34 is switched from the connection state for extracting a dark current to the connection state for extracting a position signal, and servo light is controlled to turn on. In this case, since the irradiation power of servo light is gradually increased from the timing when servo light is controlled to turn on, in the period C including a timing immediately after servo light is turned on, the PSD voltage signal becomes a minus value, and by the time when the scanning operation is transited to the period D, the PSD voltage signal becomes a plus value. However, in the circuit configuration for use in the above measurement, the latter amplifier 35 is configured not to output a minus value, and the output range of the latter amplifier 35 is set from 0 to 5V. Accordingly, as shown in FIGS. 12A through 12D, the PSD voltage signal in the period C is set to 0V.

As described above, in this embodiment, it is possible to acquire a PSD voltage signal corresponding to a dark current by setting the connection state of the switching circuit 34 to the connection state for extracting a dark current in a period when servo light is turned off.

Figure 13B:
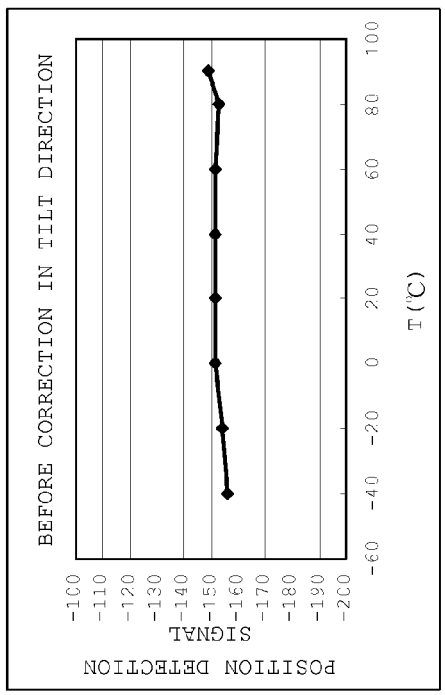
FIGS. 13A through 13D are diagrams showing changes in a position detection signal in the embodiment.
Figure 13D:
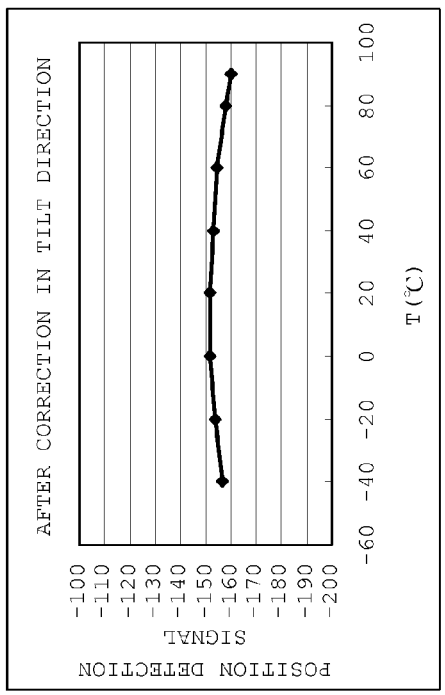
Figure 13A:
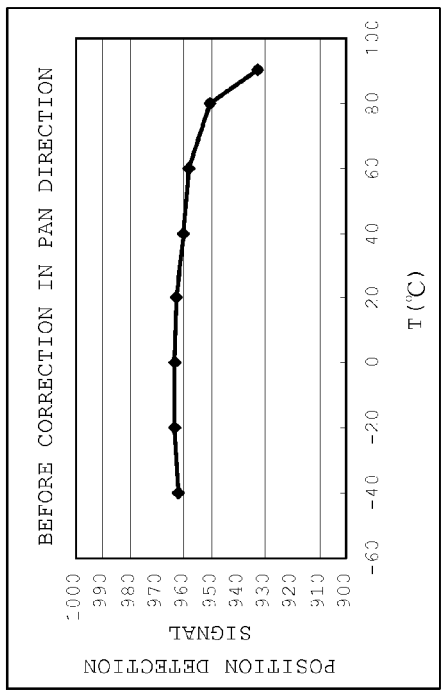
Figure 13C:
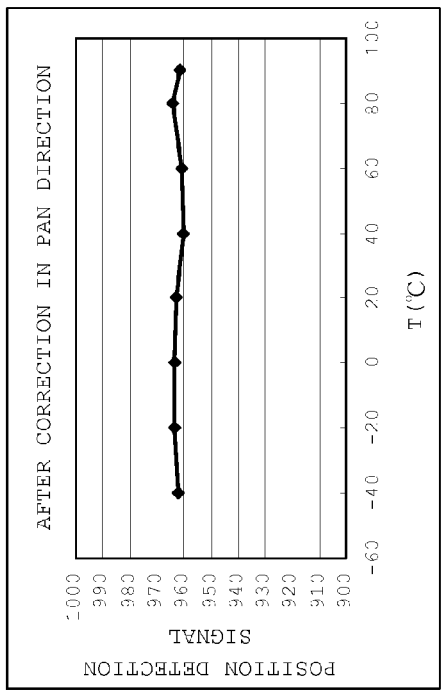

FIGS. 13A through 13D are diagrams showing measurement results on a relation between a temperature and a position detection signal, in the case where servo light is irradiated at a position near a lower right portion of a scanning area (see FIG. 5) of servo light on the PSD 315, in the arrangement of this embodiment. FIGS. 13A and 13B are diagrams respectively showing position detection signals in Pan direction and Tilt direction, in the case where dark current correction is not performed. FIGS. 13C and 13D are diagrams respectively showing position detection signals in Pan direction and Tilt direction, in the case where dark current correction is performed in accordance with the arrangement of this embodiment. In FIGS. 13A through 13D, the axes of abscissas represent an ambient temperature of the PSD 315, and the axes of ordinate represent a position detection signal. Further, in FIGS. 13A through 13D, the scale interval (10) on the axes of ordinate corresponds to a swing angle of 0.2 degree of scan laser light.

As is clear from FIG. 13A, although a position detection signal in Pan direction is approximately constant when the ambient temperature is from about −40° C. to 20° C., a position detection signal is decreased, as the ambient temperature is increased, when the ambient temperature is from 20° C. to 90° C. This is presumably because the amount of a dark current component which is superimposed on a position detection signal is changed, as the ambient temperature is increased (see FIG. 6). In this case, if the ambient temperature is increased, the irradiation position of servo light in Pan direction may be detected to be a position closer to the origin point of the PSD 315 with respect to a normal position.

On the other hand, in FIG. 13C, even if the ambient temperature of the PSD 315 is increased, a decrease in the level of a position detection signal is suppressed by correcting a dark current. Further, as compared with FIG. 13A, variation of a position detection signal is suppressed in FIG. 13C, without depending on the ambient temperature. With this configuration, since the irradiation position of servo light can be accurately detected, it is possible to control scan laser light to properly scan along a trajectory.

As is clear from FIG. 13B, a position detection signal in Tilt direction is increased, as the ambient temperature is increased. This is presumably because the amount of a dark current component which is superimposed on a position detection signal is changed, as the ambient temperature is increased (see FIG. 6). In this case, if the ambient temperature is increased, the irradiation position of servo light in Tilt direction may be detected to be a position closer to the origin point of the PSD 315 with respect to a normal position. On the other hand, in FIG. 13D, even if the ambient temperature of the PSD 315 is increased, variation of a position detection signal is suppressed by correcting a dark current.

In this embodiment, the scanning area of servo light on the PSD 315 is set in such a manner that the scanning range in Pan direction is wider and the scanning range in Tilt direction is narrower. Generally, influence of a dark current which is superimposed on an output signal from a PSD is increased, as the irradiation position of servo light is farther away from the origin point of the PSD. In the measurement of this embodiment, since servo light is irradiated at a position (see FIG. 5) on the PSD 315 near the lower right portion of the scanning area of servo light, the irradiation position of servo light is greatly away from the origin point in Pan direction, and is not far away from the origin point in Tilt direction. As a result, a dark current which is superimposed on a position detection signal strongly affects in Pan direction than in Tilt direction. For the above reason, it is conceived that the change width of a position detection signal resulting from a temperature change is increased in FIG. 13A, as compared with FIG. 13B.

In this embodiment, as is clear from the measurement results shown in FIGS. 13A through 13D, precision of a position detection signal in Pan direction where the scanning range is wide is effectively enhanced. An advantageous effect as shown in Pan direction is not obtained with respect to a position detection signal in Tilt direction, because the scanning range in Tilt direction is narrow.

As compared with FIG. 13B, a position detection signal slightly varies in FIG. 13D depending on the ambient temperature. In this case, however, the distribution of a position detection signal also lies within a range corresponding to a swing angle of 0.2 degree in Tilt direction. This enables to control scan laser light to scan a target area in Tilt direction without a drawback, based on the position detection signal in Tilt direction shown in FIG. 13D.

As described above, in this embodiment, since a dark current is converted into a voltage signal in a processable range of the A/D conversion circuit 41, and the converted voltage signal is inputted to the A/D conversion circuit 41, it is possible to properly detect the dark current. Further, it is possible to process a voltage signal corresponding to a dark current by the A/D conversion circuit 41 by applying a simplified configuration that the voltage level generating circuit 33 for extracting a dark current and the switching circuit 34 are added.

Further, in this embodiment, while a target area is not scanned with scan laser light, in other words, at a predetermined timing in the return zones shown in FIGS. 10A through 10D since irradiation of servo light is suspended for detection of a dark current, it is possible to detect a dark current without obstructing a scanning operation of scan laser light in the target area.

In this embodiment, an increase in the ambient temperature of the PSD 315 is described as an example of factors of generating a dark current. There are other cases that an error signal similar to a dark current may be generated, depending on light which may be entered into the PSD 315. For instance, there are cases that external light may be entered into the PSD 315, because the beam irradiation device is installed in a very bright condition, and that scan laser light may be entered into the PSD 315 depending on an arrangement of the beam irradiation device. In these cases, since an A/D output signal is corrected based on a PSD voltage signal to be obtained when servo light is turned off in the similar manner as the embodiment, it is possible to detect a position detection signal with high precision.

In the foregoing, the embodiment of the invention is described. The invention is not limited to the foregoing embodiment, and the embodiment of the invention may be changed in various ways other than the above.

For instance, in the embodiment a, a semiconductor laser is used as a light source of servo light. Alternatively, an LED (Light Emitting Diode) may be used, in place of the semiconductor laser.

In the embodiment, laser light is allowed to scan a targeted area by driving the mirror 113. Alternatively, a lens may be used in place of the mirror 113, and the lens may be two-dimensionally driven to scan a targeted area with laser light. In the above modification, for instance, a light source for emitting servo light may be disposed on a lens holder to receive the servo light from the light source on the PSD. Further alternatively, a part of laser light transmitted through the lens may be separated by a beam splitter, and the laser light after the separation may be received on the PSD as servo light. In the latter modification, it is necessary to provide an arrangement, wherein the laser light source emits weak light, and the emission power of the laser light source is increased to emit pulse light at an irradiation timing onto the targeted area so that the servo light is constantly guided to the PSD.

In the embodiment, the propagating direction of servo light is changed by using the transparent member 200. Alternatively, a servo mirror may be mounted on the pivotal shaft 112 of the mirror actuator 100, in place of the transparent member 200, to change the propagating direction of servo light by reflecting the servo light on the servo mirror. Further alternatively, a light source for emitting servo light may be disposed on the mirror holder 110, the pivotal shaft 111, or the pivotal shaft 112.

Further, in this embodiment, the level adjusting circuits 2 through 5 are disposed for current signals to be outputted from the electrodes X1, X2, Y1, and Y2 to suppress dark currents which are superimposed on voltage signals corresponding to each electrode. Alternatively, only dark currents which are superimposed on voltage signals corresponding to the electrodes X1 and X2 may be suppressed. For instance, in the level adjusting circuits 4 and 5, the voltage level generating circuit 33 for extracting a dark current and the switching circuit 34 may be omitted, and an amplifier offset voltage signal from the voltage level generating circuit 32 for extracting a position signal may be constantly inputted to the latter amplifier 35.

Further, in this embodiment, A/D conversion circuits corresponding to the electrodes X1, X2, Y1, and Y2 are provided in the control circuit 6. Alternatively, these A/D conversion circuits may be included in the level adjusting circuits 2 through 5.

In this embodiment, the PSD 315 is used as a photodetector for receiving servo light. Alternatively, a four-division sensor may be used in place of the PSD 315. Since a dark current is generated in a four-division sensor as well as a PSD, it is desirable to employ an arrangement similar to the above arrangement in the above modification.

Figure 14:
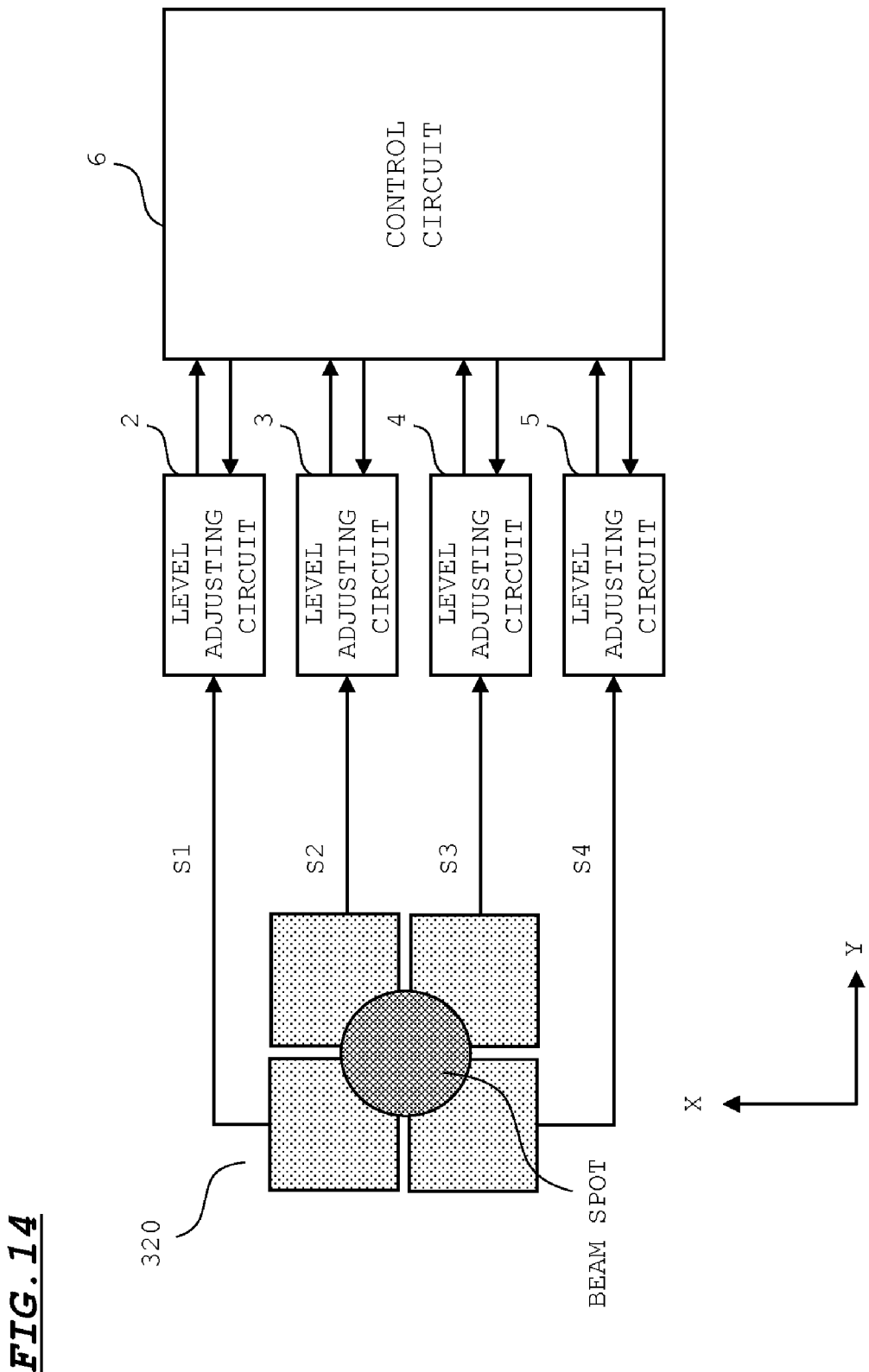
FIG. 14 is a diagram showing a modification of a photodetector in the embodiment.

FIG. 14 is a diagram showing an arrangement, in the case where a four-division sensor 320 is used as a photodetector for receiving servo light. Servo light is irradiated onto a center position of the four-division sensor 320 when a mirror 113 is set to a neutral position. When servo light is irradiated onto the four-division sensor 320, as shown in FIG. 13, each sensing portion of the four-division sensor 320 output current signals S1, S2, S3, and S4.

Similarly to the embodiment, the current signals 51 through S4 are converted into voltage signals in level adjusting circuits 2 through 5 when servo light is turned on and when servo light is turned off, and thereafter, the voltage signals are subjected to signal processing in the same manner as in the embodiment. Specifically, the current signals S1 through S4 are converted into position detection voltage signals corresponding to the time when servo light is turned on and the time when servo light is turned off by the level adjusting circuits 2 through 5. The position detection voltage signals corresponding to the current signals S1 through S4 are converted into digital signals by A/D conversion circuits 41 in a control circuit 6, and thereafter, the digital signals are stored in a memory 6a. The position detection voltage signals (digital signals) acquired in the scanning zones shown in FIGS. 10A through 10D are subjected to dark current correction by a signal computing circuit 6b, based on the position detection voltage signals (digital signals) acquired when servo light is turned off in return zones, and are respectively converted into voltage signals Sv1, Sv2, Sv3, and Sv4.

Further, the signal computing circuit 6b in the control circuit 6 obtains an incident position x of servo light in X direction and an incident position y of servo light in Y direction, based on e.g. the following equations, using the voltage signals Sv1 through Sv4.

$$\frac{(Sv1+Sv2)-(Sv3+Sv4)}{Sv1+Sv2+Sv3+Sv4}=x$$

$$\frac{(Sv1+Sv4)-(Sv2+Sv3)}{Sv1+Sv2+Sv3+Sv4}=y$$

Then, a servo laser driving circuit 8, a scan laser driving circuit 10, and an actuator driving circuit 12, which are disposed posterior to the control circuit 6, are controlled, based on the incident position of servo light obtained in the above-described manner.

The embodiment of the invention may be changed or modified in various ways as necessary, as far as such changes and modifications do not depart from the scope of the present invention hereinafter defined.

What is claimed is:

1. A beam irradiation device comprising:
a laser light source for emitting laser light;
an actuator for causing the laser light to scan a targeted area;
a servo optical system for changing a propagating direction of servo light in accordance with driving of the actuator;
a photodetector for receiving the servo light and outputs a detection signal depending on a light receiving position of the servo light;
a signal processing section for obtaining the light receiving position based on the detection signal; and
a control section for controlling the laser light source and the actuator based on the light receiving position obtained by the signal processing section, wherein
the signal processing section includes:
an A/D conversion circuit for converting the detection signal into a digital signal;
an error signal adjusting circuit which converts an error component signal outputted from the photodetector when the photodetector is not irradiated by the servo light into a signal within a processable range of the A/D conversion circuit, and supplies the converted signal to the A/D conversion circuit; and
a signal computing circuit for correcting a first digital signal derived from the detection signal outputted from the photodetector when the photodetector is irradiated by the servo light with a second digital signal derived from the error component signal outputted from the photodetector when the photodetector is not irradiated by the servo light to obtain the light receiving position.

2. The beam irradiation device according to claim 1, wherein
the signal processing section includes a range adjusting circuit for adjusting a change width of the detection signal to match with the processable range of the A/D conversion circuit based on a first offset signal, and
the error signal adjusting circuit replaces the first offset signal with a second offset signal different from the first offset signal, when the photodetector is not irradiated by the servo light, and supplies the second offset signal to the range adjusting circuit.

3. The beam irradiation device according to claim 1, wherein
irradiation of the servo light onto the photodetector is suspended during a predetermined time zone when the target area is not scanned with the laser light, and the signal into which the error component signal is converted by the error signal adjusting circuit is supplied to the A/D conversion circuit during the predetermined time zone.

4. The beam irradiation device according to claim 3, wherein
the second digital signal is generated based on a digital signal derived from a plurality of the error component signals acquired from a series of the time zones, and the generated second digital signal is used in the correction when the target area is scanned with the laser light in a scanning operation succeeding to the series of the time zones.

5. The beam irradiation device according to claim 4, wherein
the second digital signal is generated by averaging the digital signals derived from the error component signals acquired from the series of the time zones.

* * * * *